US006673851B2

(12) United States Patent
Moy et al.

(10) Patent No.: US 6,673,851 B2
(45) Date of Patent: Jan. 6, 2004

(54) SELF-PHOTOINITIATING MULTIFUNCTIONAL ACRYLATES

(75) Inventors: Thomas Michael Moy, Hilliard, OH (US); R. Scott Harvey, Worthington, OH (US)

(73) Assignee: Ashland Inc., Ashland, KY (US)

( * ) Notice: Subject to any disclaimer, the term of this patent is extended or adjusted under 35 U.S.C. 154(b) by 26 days.

(21) Appl. No.: 09/974,819

(22) Filed: Oct. 12, 2001

(65) Prior Publication Data

US 2003/0073757 A1 Apr. 17, 2003

(51) Int. Cl.$^7$ ............... C08F 2/46; C08F 20/18; C08F 26/00
(52) U.S. Cl. ............ 522/173; 522/35; 522/39; 522/63; 528/229; 526/328; 526/312
(58) Field of Search ................ 522/173, 10, 14, 522/28, 35, 39, 65, 167, 175, 63; 528/229, 306, 310, 332, 335; 526/312, 310, 328

(56) References Cited

U.S. PATENT DOCUMENTS

| | | | |
|---|---|---|---|
| 3,925,349 A | 12/1975 | Gaske | 204/159.15 |
| 4,217,439 A | 8/1980 | Heckles | 528/220 |
| 4,218,515 A | 8/1980 | Heckles | 428/474 |
| 4,221,902 A | 9/1980 | Heckles | 528/228 |
| 4,284,776 A * | 8/1981 | Gruber et al. | 544/400 |
| 4,795,787 A | 1/1989 | Walz | 525/328.2 |
| 4,871,822 A * | 10/1989 | Brindopke et al. | 526/271 |
| 5,021,511 A | 6/1991 | Larson et al. | 525/295 |
| 5,430,177 A | 7/1995 | Sabahi et al. | 560/190 |
| 5,945,489 A | 8/1999 | Moy et al. | 525/471 |
| 5,969,046 A * | 10/1999 | Schindler et al. | 525/108 |
| 6,025,410 A * | 2/2000 | Moy et al. | 522/182 |
| 6,172,129 B1 * | 1/2001 | Fan et al. | 522/167 |

* cited by examiner

*Primary Examiner*—Susan W. Berman
(74) *Attorney, Agent, or Firm*—Connolly Bove Lodge & Hutz LLP

(57) ABSTRACT

Self-photoinitiating liquid oligomeric compositions having tertiary amine groups are provided by Michael Addition reaction of:

A) an uncrosslinked Michael Addition reaction product of a multifunctional acrylate acceptor and a Michael Donor; and B) a primary and/or secondary amine. The compositions can be crosslinked to make coatings, laminates and adhesives.

24 Claims, No Drawings

SELF-PHOTOINITIATING MULTIFUNCTIONAL ACRYLATES

DESCRIPTION

1. Technical Field

The present invention relates to self-photoinitiating multifunctional acrylate compositions. More particularly, the present invention relates to liquid oligomeric multifunctional acrylate compositions having tertiary amine groups bound as part of the polymer structure. The compositions of the present invention cure upon exposure to active radiation such as UV light in the absence of an added photoinitiator. Films made from the crosslinked oligomers of the invention are used as protective or decorative coatings on various substrates. The oligomers can be added to other resins used in adhesives or composites.

2. Background of Invention

Multifunctional acrylates, methacrylate and other unsaturated monomers are widely used in coatings, adhesives, sealants, elastomers, crosslinked films, foundry sand binders and composite structures. These monomers may be crosslinked by free radical chain mechanism, which may require any of a number of free radical generating species such as peroxides, hydroperoxides or azo compounds, for example, which may decompose to form radicals when heated, or at ambient temperature in the presence of amines or transition metal promoters.

Another means of initiating reaction, currently not as widespread but gaining in popularity, is the use of UV radiation to decompose photoinitiators to free radicals. This method offers extremely rapid processing potential for a number of applications, as the transformation from a liquid reactive composition to a crosslinked solid is essentially instantaneous upon exposure to UV radiation.

A drawback to both means of effecting free radical reaction is that the decomposition of initiator or photoinitiator can produce low molecular weight fragments that may volatilize during or after the manufacturing process, creating issues with regard to worker, consumer and environmental safety. For instance, these low molecular weight fragments tend to be readily absorbed through skin which can cause adverse health effects.

Another drawback is that free radical reactions of acrylates are typically inhibited by oxygen, i.e. the presence of oxygen prevents complete reaction.

These limitations have been addressed in several key approaches. The challenge of fugitive emissions during manufacturing processes or subsequent leaching due to photoinitiator fragments has been attacked by creating acrylate monomers/oligomers with "built-in" photoinitiators. This may be accomplished by starting with a compound which is known to function as a photoinitiator (or a suitable derivative) and either functionalizing it with an appropriate unsaturated group, i.e. acrylate or methacrylate, so as to produce a new compound which functions as both monomer/oligomer and photoinitiator, or by "grafting" onto a preformed oligomer/polymer in order to produce a higher molecular weight photoinitiator.

Regardless of the effectiveness of these methods, they add additional manufacturing procedures and costs.

Also, with these approaches, low functionality may be detrimental to reactivity and final properties, and catalyst or initiator may be required to effect crosslinking.

A more recent and effective solution is described in U.S. Pat. Nos. 5,945,489 and 6,025,410 to Moy et al and assigned to Ashland, Inc., the assignee of the present application. Such approach involves reacting multifunctional acrylates with acetoacetates via Michael Addition in ratios which yield uncrosslinked, acrylate-functional resins. These resins crosslink upon exposure to an appropriate UV source in the absence of added photoinitiators.

Oxygen inhibition of free radical acrylate reactions can be eliminated by inerting, i.e. exclusion of oxygen by inert gases, nitrogen being the most common. While this is an obvious solution, it is generally most appropriate for research or for specialty purposes since it is oftentimes impractical or prohibitively expensive for large-scale industrial applications. Another option, frequently more attractive from a cost perspective, is the use of amine synergists, tertiary amines which enhance surface cure. A wide variety are available, but even well-known simple compounds such as common ethanolamine derivatives may function as effective synergists. However, as these are generally somewhat lower molecular weight compounds which may be present at 5 to as much as 15% (by weight) of a formulation in addition to added photoinitiators, fugitive emissions or subsequent leaching remain a potential problem.

Accordingly, considerable room still exists for improvement, such as addressing problems associated with added low molecular weight photoinitiators and synergists.

SUMMARY OF INVENTION

The present invention relates to significantly reducing, if not eliminating, problems associated with added low molecular weight photoinitiators and synergists by incorporating appropriate functional groups for these purposes into multifunctional acrylates/acrylate functional oligomers.

In particular, the present invention is directed to a self-photoinitiating liquid oligomeric composition having tertiary amine groups comprising a Michael-type Addition reaction product of:

A) uncrosslinked Michael addition reaction product of a multifunctional acrylate acceptor and a Michael Donor wherein the amount of the Michael Donor is not sufficient to effect crosslinking; and B) a primary and/or secondary amine.

The multifunctional acrylate is employed in excess of the Michael Donor and typically the equivalent ratio of the multifunctional acrylate to Michael Donor is about >1:1 to about 13.2:1. The equivalent ratio of unreacted acrylate double bands in A):B) is typically about 100:1 to about 2:1.

The present invention also relates to crosslinked products obtained by subjecting the above disclosed self-photoinitiating liquid oligomeric compositions to actinic light such as UV radiation.

The present invention also relates to curing the above disclosed self-photoinitiating liquid oligomeric compositions by exposing the compositions to actinic light.

Another aspect of the present invention relates to a method which comprises applying the above disclosed self-photoinitiating liquid oligomeric composition to a substrate and then exposing the composition to actinic light.

A still further aspect of the present invention relates to the product obtained by the above disclosed method.

Still other objects and advantages of the present invention will become readily apparent by those skilled in the art from the following detailed description, wherein it is shown and described preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

BEST AND VARIOUS MODES FOR CARRYING OUT INVENTION

Among the multiacrylates used to make the oligomers of this invention are diacrylates, triacrylates and tetracrylates.

Examples of diacrylates are:

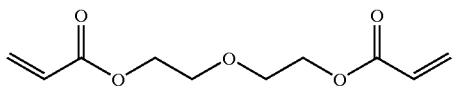

Diethylene Glycol Diacrylate, MW = 214, f = 2

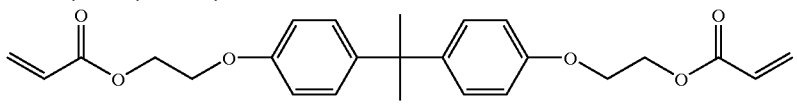

Ethoxylated Bisphenol A Diacrylate, MW = 424, f = 2

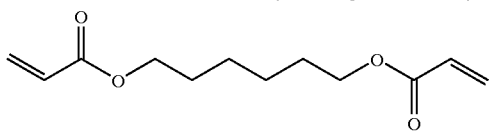

1, 6-Hexanediol Diacrylate, MW = 226, f = 2

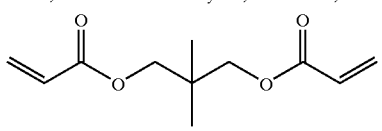

Neopentyl Glycol Diacrylate, MW = 212, f = 2

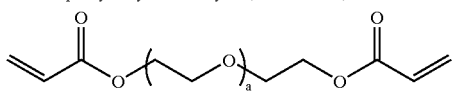

Polyethylane Glycol Diacrylate, MW = 302, 508, f = 2

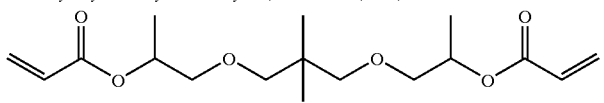

Propoxylated Neopentyl Glycol Diacrylate, MW = 328, f = 2

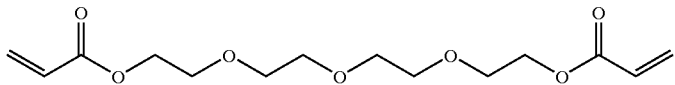

Tetraethylene Glycol Diacrylate, MW = 302, f = 2

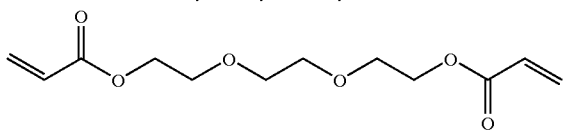

Triethylene Glycol Diacrylate, MW = 258, f = 2

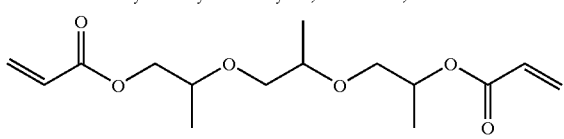

Tripropylene Glycol Diacrylate, MW = 300, f = 2

Examples of triacrylates are:

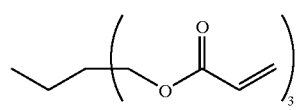

Trimethylolpropane Triacrylate (TMPTA), MW = 296, f = 3

-continued

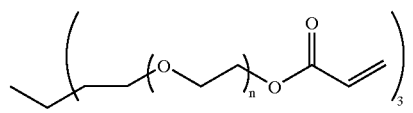

Ethoxylated Trimethylolpropane Triacrylate, MW = 428, f = 3

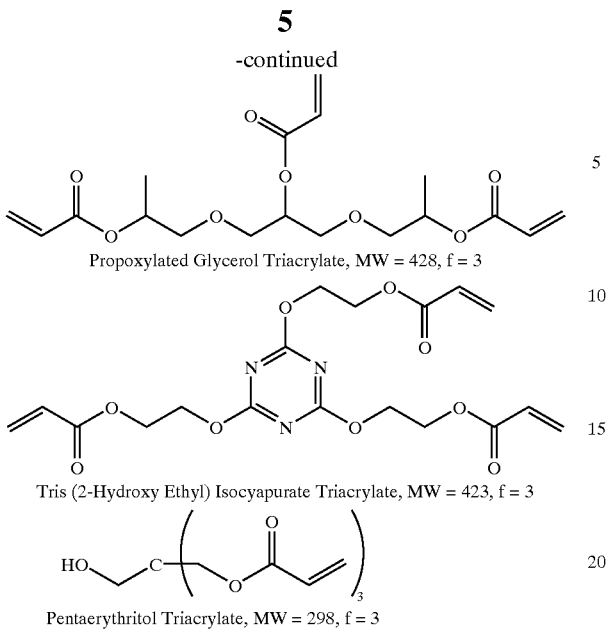

Propoxylated Glycerol Triacrylate, MW = 428, f = 3

Tris (2-Hydroxy Ethyl) Isocyapurate Triacrylate, MW = 423, f = 3

Pentaerythritol Triacrylate, MW = 298, f = 3

A useful tetracrylate is
Pentaerythritol Tetraacrylate (PETA), MW = 352, f = 4

Examples of suitable Michael Donors include active methylene compounds such as acetoacetates, cyanoacetates, 2,4-pentanediones, malonate esters, acetoacetanilides, and acetoacetamides. The Michael Donors have functionality of at least two and typically from about 2 to about 8.

Examples of acetoacetates having a functionality of two are:

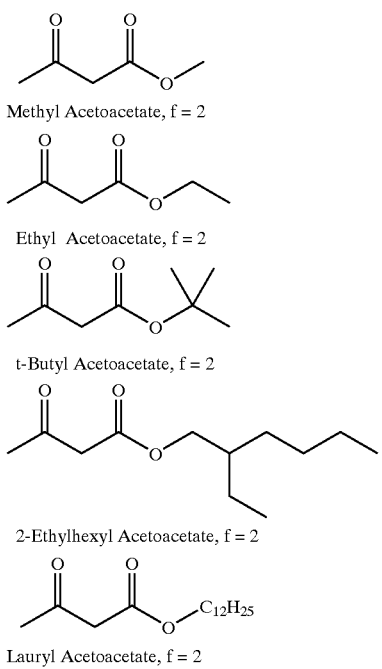

Methyl Acetoacetate, f = 2

Ethyl Acetoacetate, f = 2 t-Butyl Acetoacetate, f = 2

2-Ethylhexyl Acetoacetate, f = 2

Lauryl Acetoacetate, f = 2

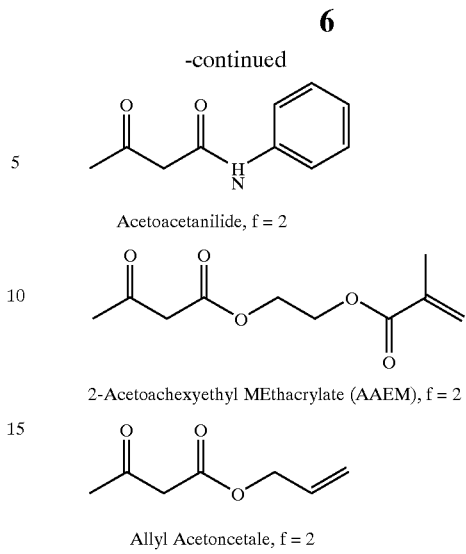

Acetoacetanilide, f = 2

2-Acetoachexyethyl MEthacrylate (AAEM), f = 2

Allyl Acetoncetale, f = 2

Examples of acetoacetates having a functionality of four are:

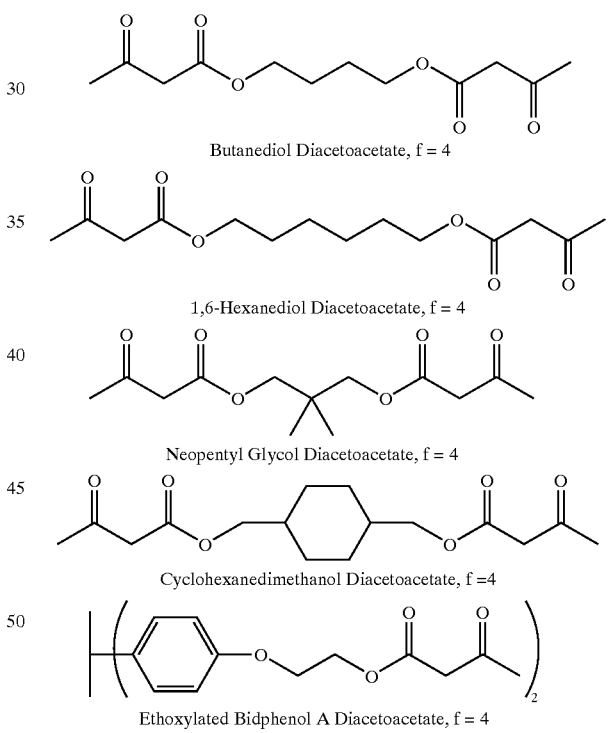

Butanediol Diacetoacetate, f = 4

1,6-Hexanediol Diacetoacetate, f = 4

Neopentyl Glycol Diacetoacetate, f = 4

Cyclohexanedimethanol Diacetoacetate, f =4

Ethoxylated Bidphenol A Diacetoacetate, f = 4

Examples of acetoacetates having a functionality of six are:

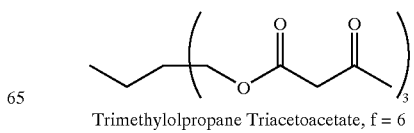

Trimethylolpropane Triacetoacetate, f = 6

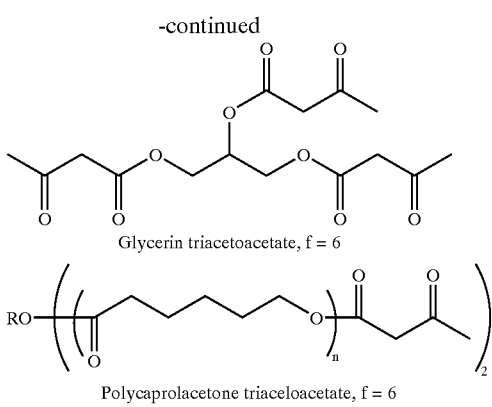

Glycerin triacetoacetate, f = 6

Polycaprolacetone triaceloacetate, f = 6

An example of an acetoacetate having a functionality of eight is:

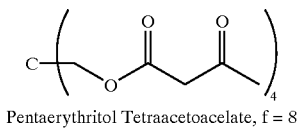

Pentaerythritol Tetraacetoacelate, f = 8

According to the present invention, the multifunctional acrylate must be employed in amounts in excess of the equivalent reaction amounts with respect to the Michael Donor. Typically, the equivalent ratio of the multifunctional acrylate to acetoacetate is at least 1:1 to about 13.2:1.

By way of illustrations, the following preferred equivalent ratios are provided:

1) diacrylate acceptor: Michael Donor of
>1:1 where donor functionality=2
≧4.5:1 where donor functionality=4
≧4.5:1 where donor functionality=6
≧4.5:1 where donor functionality=8
2) triacrylate acceptor: Michael donor of
≧2.25 where donor functionality=2
≧6.4:1 where donor functionality=4
≧7.8:1 where donor functionality=6
≧7.4:1 where donor functionality=8
3) tetraacrylate acceptor: Michael Donor of
≧6.6:1 where donor functionality=2
≧12.3:1 where donor functionality=4
≧13.2:1 where donor functionality=6
≧12.7:1 where donor functionality=8.

The equivalent ratio of the unreacted acrylate double bands in above Michael reaction product to the secondary amine is typically about 100:1 to about 2:1, more typically about 50:1 to about 4:1, and preferably about 10:1 to about 6:1.

Typical primary amines are aliphatic amines such as mono- and poly-amines and including alkyl amines, hydroxyalkyl amines and cyclic amines. Examples of same suitable primary amines are ethanolamine, 1-amino-2-propanol, aminopropyl triethoxysilane; difunctional primary amines such as methyl-1,6-hexanediamine, 2-methyl-1,5-pentanediamine, 1,3-diamino pentane; Jeffamine® T-403 (a trifunctional amine); 3-aminopropyl trimethoxysilane, ethylamine, ethylene diamine, benzylamine, n-butylamine, sec-butylamine, 2-amino-1-butanol, 3-amino-1,2-propanediol, 3-(dimethylamino) propylamine, 3-(diethylamino) propylamine, propylamine, diaminopropane, diaminobutane, hexylamine, heptylamine, 1,6-hexanediamine, 1,2-diaminocyclohexane, 1,4-diamino cyclohexane, diethylenetriamine, triethylenetetramine, tetraethylenepentamine and isophorone diamine.

Typically, secondary amines are alkyl amines, hydroxyalkyl amines and cyclic amines. Suitable alkyl amines are dimethylamine, diethylamine and dipropylamine, and dibutylamine. Suitable hydroxyalkyl amines are diethanolamine and N-methylethanolamine. Suitable cyclic amines are piperidine, piperazine and morpholine.

The secondary amines are preferred.

The Michael addition reactions can be catalyzed by a strong base; diazabicycloundecene (DBU) is sufficiently strong and readily soluble in the monomer mixtures. Other cyclic amidines, for example diazabicyclo-nonene (DBN) and guanidines are also suitable for catalyzing this reaction.

The compositions of the present invention can be cured without added photoinitiators by exposure to actinic light and especially to UV radiation.

The liquid oligomer compositions of the present invention, since they are liquids, can readily be applied to various substrates using coating technologies such as roll or spray prior to the actinic light cure.

The following non-limiting examples are presented to further illustrate the present invention. In the following examples, all parts are by weight unless otherwise indicated. In addition, all references mentioned herein are specifically incorporated by reference.

EXAMPLE 1

A 2 g sample of resin prepared via the Michael Addition of ethyl acetoacetate (5%) to trimethylolpropane triacrylate (TMPTA, 95%) followed by reaction with diethanolamine (10% with respect to acrylate component) is placed in an aluminum pan and subjected to one 630 mJ/cm$^2$ (approximate) exposure to a Fusion "H" bulb. A rigid, dry, tack-free film with no amine odor is obtained.

COMPARISON EXAMPLE 1A

Example 1 is repeated except that the secondary amine was not used. A rigid film with a slightly tacky surface (slight oxygen inhibition) is obtained.

COMPARISON EXAMPLE 1B

A 2 g sample of resin prepared via the Michael-Type Addition of diethanol amine (10%) and TMPTA (90%) is placed in an aluminum pan and subjected to one 630 mJ/cm$^2$ (approximate) exposure to a Fusion "H" bulb. A thin, fragile "skin" forms over unreacted material.

COMPARISON EXAMPLE 1C

A 2 g mixture consisting of TMPTA (90%) and N,N-dimethyl ethanolamine (10%) is placed in an aluminum pan and subjected to one 630 mJ/cm$^2$ (approximate) exposure to a Fusion "H" bulb. A fragile film with a wet surface forms; a strong amine odor is detected.

COMPARISON EXAMPLE 1D

A 2 g sample of TMPTA is placed in an aluminum pan and subjected to one 630 mJ/cm$^2$ (approximate) exposure to a Fusion "H" bulb. TMPTA remains liquid, with no evidence of reaction.

EXAMPLE 2

A 2 g sample of resin prepared via the Michael Addition of ethyl acetoacetate (5%) propoxylated glycerin triacrylate (GPTA) (95%) followed by reaction with diethanolamine (10% with respect to acrylate component) is placed in an aluminum pan and subjected to one 630 mJ/cm$^2$ (approximate) exposure to a Fusion "H" bulb. A rigid, dry, tack-free film with no amine odor is obtained.

COMPARISON EXAMPLE 2A

A 2 g sample of resin prepared via the Michael Addition of ethyl acetoacetate (5%) to GPTA (95%) is placed in an aluminum pan and subjected to one 630 mJ/cm$^2$ (approximate) exposure to a Fusion "H" bulb. A rigid film with a slightly wet surface (some oxygen inhibition) is obtained.

COMPARISON EXAMPLE 2B

A 2 g sample of resin prepared via the Michael-Type Addition of diethanol amine (10%) and GPTA (90%) is placed in an aluminum pan and subjected to one 630 mJ/cm$^2$ (approximate) exposure to a Fusion "H" bulb. A thin, fragile "skin" forms over unreacted material.

COMPARISON EXAMPLE 2C

A 2 g mixture consisting of GPTA (90%) and N,N-dimethyl ethanolamine (10%) is placed in an aluminum pan and subjected to one 630 mJ/cm$^2$ (approximate) exposure to a Fusion "H" bulb. A fragile film with a wet surface forms; a strong amine odor is detected.

COMPARISON EXAMPLE 2D

A 2 g sample of GPTA is placed in an aluminum pan and subjected to one 630 mJ/cm$^2$ (approximate) exposure to a Fusion "H" bulb. GPTA remains liquid, with no evidence of reaction.

EXAMPLE 3

A 2 g sample of resin prepared via the Michael Addition of ethyl acetoacetate (5%) to pentaerythritol triacrylate (SR 444) (95%) followed by reaction with diethanolamine (10% with respect to acrylate component) is placed in an aluminum pan and subjected to one 630 mJ/cm$^2$ (approximate) exposure to a Fusion "H" bulb. A rigid, dry, tack-free film with no amine odor is obtained.

COMPARISON EXAMPLE 3A

A 2 g sample of resin prepared via the Michael Addition of ethyl acetoacetate (5%) of SR 444 (95%) is placed in an aluminum pan and subjected to one 630 mJ/cm$^2$ (approximate) exposure to a Fusion "H" bulb. A rigid film with a slightly tacky surface (slight oxygen inhibition) is obtained.

COMPARISON EXAMPLE 3B

A 2 g sample of resin prepared via the Michael-Type Addition of diethanol amine (10%) and SR 444 (90%) is placed in an aluminum pan and subjected to one 630 mJ/cm$^2$ (approximate) exposure to a Fusion "H" bulb. A thin, fragile "skin" forms over unreacted material.

COMPARISON EXAMPLE 3C

A 2 g mixture consisting of SR 444 (90%) and N,N-dimethyl ethanolamine (10%) is placed in an aluminum pan and subjected to one 630 mJ/cm$^2$ (approximate) exposure to a Fusion "H" bulb. A fragile film with a wet surface forms; a strong amine odor is detected.

COMPARISON EXAMPLE 3D

A 2 g sample of SR 444 is placed in an aluminum pan and subjected to one 630 mJ/cm$^2$ (approximate) exposure to a Fusion "H" bulb. SR 444 remains liquid, with no evidence of reaction.

EXAMPLE 4

A 2 g sample of resin prepared via the Michael-Type Addition of ethanolamine (5%) to pentaerythritol triacrylate (95%), followed by DBU-catalyzed Michael Addition of ethyl acetoacetate (2.5%) to the amine-pentaerythritol triacrylate product (97.5%), is placed in an aluminum pan and subjected to one 500 mJ/cm$^2$ (approximate) exposure to a 300 W/in Fusion "H" bulb. A rigid, dry, tack-free film is obtained.

COMPARISON EXAMPLE 4A

A 2 g sample of resin via the DBU-catalyzed Michael Addition of ethyl acetoacetate (2.6%) to pentaerythritol triacrylate (97.4%) is placed in an aluminum pan and subjected to one 500 mJ/cm$^2$ (approximate) exposure to a 300 W/in Fusion "H" bulb. A rigid film with a slightly tacky surface (slightly oxygen inhibited) is obtained.

COMPARISON EXAMPLE 4B

A 2 g sample of resin prepared via the Michael-Type Addition of ethanolamine (5%) to pentaerythritol triacrylate (95%) is placed in an aluminum pan and subjected to one 500 mJ/cm$^2$ (approximate) exposure to a 300 W/in Fusion "H" bulb. A thin, fragile surface "skin" forms over unreacted liquid material.

EXAMPLE 5

A 2 g sample of resin prepared via the Michael-Type Addition of Vestamin® TMD (5%) to pentaerythritol triacrylate (95%), followed by DBU-catalyzed Michael Addition of ethyl acetoacetate (2.5%) in the amine-pentaerythritol triacylate product (97.5%), is placed in an aluminum pan and subjected to one 500 mJ/cm$^2$ (approximate) exposure to a 300 W/in Fusion "H" bulb. A rigid, dry, tack-free film is obtained.

COMPARISON EXAMPLE 5A

A 2 g sample of resin prepared via the Michael-Type Addition of Vestamin® TMD (trimethyl-1,6-hexanediamine, mix of 2,2,4- and 2,4,4-isomers, 5%) to pentaerythritol triacrylate (95%) is placed in an aluminum pan and subjected to one 500 mJ/cm$^2$ (approximate) exposure to a 300 W/in Fusion "H" bulb. A thin, fragile surface "skin" forms over unreacted liquid material.

EXAMPLE 6

A 2 g sample of resin prepared via the Michael-Type Addition of Dytek® A(2-methyl-1,5-pentanediamine, 2.5%) to pentaerythritol triacrylate product (97.5%), was placed in an aluminum pan and subjected to one 500 mJ/cm$^2$ (approximate) exposure to a 300 W/in Fusion "H" bulb. A rigid, dry, tack-free film was obtained.

EXAMPLE 6A

A 2 g sample resin prepared via the Michael-Type Addition of Dytek® A(2-methyl-1,5-pentanediamine, 2.5%) to pentaerythritol triacrylate (97.5%) was placed in an alumi-

EXAMPLE 7

A 2 g sample of resin prepared via the Michael-Type Addition of Dytek® EP (1,3-diamino pentane, 2.5%) to pentaerythritol triacrylate (97.5%), followed by DBU-catalyzed Michael Addition of ethyl acetoacetate (2.5%) to the amine-pentaerythritol triacrylate product (97.5%), is placed in an aluminum pan and subjected to one 500 mJ/cm² (approximate) exposure to a 300 W/in Fusion "H" bulb. A rigid, dry, tack-free film is obtained.

COMPARISON EXAMPLE 7A

A 2 g sample of resin prepared via the Michael-Type Addition of Dytek® EP (1,3-diamino pentane, 2.5%) to pentaerythritol triacrylate (97.5%) is placed in an aluminum pan and subjected to one 500 mJ/cm² (approximate) exposure to a 300 W/in Fusion "H" bulb. A thin, fragile surface "skin" forms over unreacted liquid material.

The following is observed from the results obtained from the above examples.

1. Controls, i.e., neat multifunctional acrylates, fail to react upon exposure to UV light in the absence of appropriate additives.

2. Blending in a tertiary amine (dimethyl ethanolamine) aids reaction, but surfaces remain wet and amine odor remains; better surface cure and lower odor results from reacting a primary or secondary amine with a portion of the acrylate groups prior to UV cure, but through cure is incomplete.

3. Acetoacetate-multifunctional acrylate products show good through cure upon exposure to UV light but some oxygen inhibition at the surface; reaction with a primary or secondary amine produces a resin with both good through cure and reduced oxygen inhibition at the surface.

According to the present invention, the primary and/or secondary amine is incorporated into the resin as a tertiary amine group—the amine is thus bound as part of the resin structure (see Scheme 1), as opposed to simple physical mixing (Scheme II). The invention crosslinks upon exposure to UV in the absence of added photoinitiator and exhibits better surface cure compared to simple blends of multifunctional acrylates and tertiary amine.

Scheme I
Michael Addition

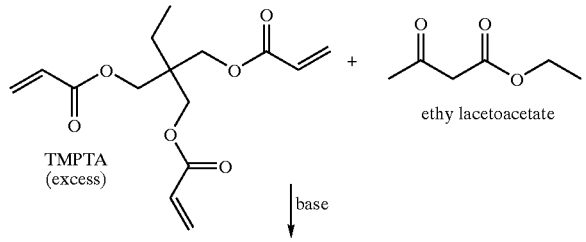

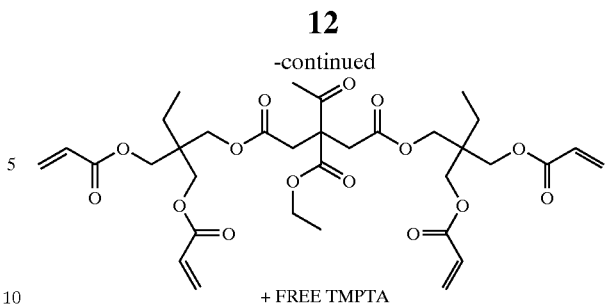

+ FREE TMPTA

Scheme II
Michael-Type Addition

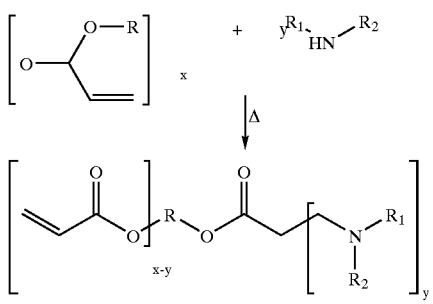

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described herein above are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A self-photoinitiating liquid oligomeric composition having tertiary amine groups comprising Michael Addition reaction product of:
   A) uncrosslinked Michael Addition reaction product of a multifunctional acrylate acceptor and an active methylene-containing Michael Donor wherein the equivalent ratio of the multifunctional acrylate to the Michael Donor is >1:1; and
   B) at least one amine selected from the group consisting of primary amines and secondary amines wherein the equivalent ratio of unreacted acrylate double bonds in A) to the amine B) is about 100:1 to about 2:1.

2. The composition of claim 1 wherein the multifunctional acrylate is a diacrylate selected from the group of diethylene glycol diacrylate, ethoxylated bisphenol A diacrylate, 1,6-hexanediol diacrylate, neopentyl glycol diacrylate, polyethylene glycol (Mn200) diacrylate, polyethylene glycol (Mn400) diacrylate, propoxylated neopentyl glycol diacrylate, tetraethylene glycol diacrylate, triethylene glycol diacrylate, and tripropylene glycol diacryalte.

3. The composition of claim 1 wherein the multifunctional acrylate is a triacrylate selected from the group consisting of trimethylopropane triacrylate, ethoxylated trimethylopropane triacrylate, tris(2-hydroxyethyl) isocyanurate triacrylate, propoxylated glyceryl triacrylate and pentaerythritol triacrylate.

4. The composition of claim 1 wherein the multifunctional acrylate comprises pentaerythritol triacrylate.

5. The composition of claim 1 wherein the multifunctional acrylate comprises diethylene glycol diacrylate.

6. The composition of claim 1 wherein the multifunctional acrylate comprises propoxylated glyceryl triacrylate.

7. The composition of claim 1 wherein the Michael Donor is at least one member selected from the group of acetoacetates, cyanoacetates, 2,4-pentanediones, malonate esters, acetoacetanilides and acetoacetamides.

8. The composition of claim 1 wherein the Michael Donor comprises an acetoactate.

9. The composition of claim 8 wherein the acetoacetate is selected from the group consisting of ethyl acetoacetate, 1-butylacetoacetate, methyl acetoacetate, 2-ethylhexyl acetoacetate, lauryl acetoacetate, acetoacetanilide, 2-acetoacetoxylethyl methacrylate, allyl acetoacetate, 1,4-butanediol diacetoacetate, 1,6-hexanediol diacetoacetate, neopentyl glycol diacetoacetate, cyclohexane dimethanol diacetoacetate, ethoxylated bisphenol A diacetoacetate, trimethylolpropane triacetoacetate, glycerin triacetoacetate, polycaprolactone triacetoacetates, and pentaerythritol tetraacetoacetate.

10. The composition of claim 1 wherein the acetoacetate comprises ethyl acetoacetate.

11. The composition of claim 1 wherein the amine is a primary amine.

12. The composition of claim 11 wherein the primary amine is at least one member selected from the group consisting of alkylamines, hydroxyalkyl amines and cyclic amines.

13. The composition of claim 11 wherein the amine is selected from the group consisting of ethanolamine, 1-amino-2-propanol, aminopropyl triethoxysilane; trimethl-1,6-hexanediamine, 2-methyl-1,5-pentanediamine, 1,3-diamino pentane; 3-aminopropyl trimethoxysilane, ethylamine, ethylene diamine, benzylamine, n-butylamine, sec-butylamine, 2-amino-1-butanol, 3-amino-1,2-propanediol, 3-(dimethylamino) propylamine, 3-(diethylamino)propylamine, propylamine, diaminopropane, diaminobutane, hexylamine, heptylamine, 1,6-hexanediamine, 1,2-diaminocyclohexane, 1,4-diamino cyclohexane, diethylenetriamine, triethylenetetramine, tetraethylenepenatmine and isophorone diamine.

14. The composition of claim 1 wherein the amine is a secondary amine.

15. The composition of claim 14 wherein the secondary amine is at least one member selected from the groups consisting of alkylamines, hydroxyalkyl amines and cyclic amines.

16. The composition of claim 14 wherein the secondary amine is at least one member selected from the group consisting of dimethylamine, diethylamine, dipropylamine, dibutylamine, diethanolamine, N-methyl ethanolamine, piperidine and morpholine.

17. The composition of claim 14 wherein the secondary amine comprises diethanolamine.

18. The composition of claim 1 wherein the equivalent ratio of the multifunctional acrylate to the Michael Donor is <1:1 to about 13.2:1.

19. A crosslinked polymer composition obtained by subjecting the composition of claim 1 to actinic light.

20. A method for curing the composition of claim 1 which comprises exposing the composition to actinic light.

21. The method of claim 20 wherein the actinic light is ultraviolet (UV) radiation.

22. A method for providing a coated substrate which comprises applying the composition of claim 1 to a substrate and then exposing the composition to actinic light.

23. The method of claim 22 wherein the actinic light is UV radiation.

24. The coated substrate obtained by the method of claim 22.

* * * * *